United States Patent Office 3,399,216
Patented Aug. 27, 1968

3,399,216
ETHYLENE KETALS OF HALOVINYLMERCAPTO-
CYCLOHEXANONES
Harold M. Foster, Middlesex, Roger P. Napier, Edison, and Chin-Chiun Chu, North Plainfield, N.J., assignors to Mobil Oil Corporation, a corporation of New York
No Drawing. Filed Dec. 20, 1965, Ser. No. 515,199
3 Claims. (Cl. 260—340.9)

ABSTRACT OF THE DISCLOSURE

Ethylene ketals of 3-(halovinylmercapto)cyclohexanone and alkyl, alkenyl, alkoxy, alkylthio, dialkylamino, and cyano ring-substituted derivatives can be prepared by reacting the corresponding ethylene ketal of 3-mercaptocyclohexanone with a halogen substituted aldehyde, using an acid catalyst. These compounds can be converted to 4-hydroxybenzothiophenes, which are used to make 4-benzothienylcarbamates, an effective class of pesticides.

---

This invention is concerned with novel ethylene ketals of 3-(halovinylmercapto)cyclohexanones and a method for preparing them.

The compounds of this invention are useful intermediates for the preparation of 4-hydroxybenzothiophenes. The 4-hydroxybenzothiophenes are converted into benzothienyl carbamates, an effective class of pesticides, as fully disclosed in copending application Ser. No. 487,333, filed Sept. 14, 1965, now U.S. 3,288,673, a continuation-in-part of application Ser. No. 427,089, filed Jan. 21, 1965, now U.S. 3,288,808, a continuation-in-part of application 334,581, filed Dec. 30, 1963, now abandoned, a continuation-in-part of application Ser. No. 220,073, filed Aug. 28, 1962, now abandoned.

In order to produce the 4-hydroxybenzothiophenes, the compounds of this invention are first converted to partly hydrogenated 4-oxobenzothiophenes, as is described hereinafter. The partly hydrogenated 4-oxobenzothiophenes are then converted into 4-hydroxybenzothiophenes by vapor or liquid phase dehydrogenation. Typical procedures for effecting such dehydrogenation are described in copending applications Ser. No. 455,604, filed May 13, 1965, now U.S. 3,345,382, Ser. No. 458,771, filed May 25, 1965, now U.S. 3,317,552, and Ser. No. 468,094, filed June 29, 1965, now U.S. 3,335,152.

Accordingly, it is a broad object of this invention to provide novel ketals of halovinylmercaptocyclohexanones. Another object is to provide intermediates for the preparation of an effective class of pesticides. A specific object is to provide ethylene ketals of 3-(halovinylmercapto)cyclohexanone, lower alkyl derivates thereof, and a process for preparing them. Other objects and advantages of this invention will become apparent to those skilled in the art, from the following detailed description.

This invention provides cyclohexanone compounds having the formula:

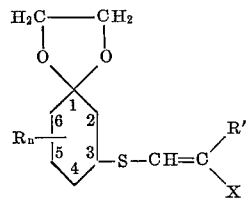

wherein R is alkyl ($C_1$—$C_8$), alkenyl ($C_2$—$C_8$), alkoxy ($C_1$—$C_4$), alkylthio ($C_1$—$C_4$), di($C_1$—$C_4$)alkylamino, or cyano, $n$ is 0 to 3, R' is hydrogen, lower alkyl ($C_1$—$C_4$), or halogen, and X is halogen.

This invention also provides a method for preparing these compounds that comprises reacting the ethylene ketal of a mercaptocyclohexanone reactant having the formula:

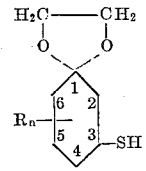

wherein R and $n$ are as above-defined, with a haloaldehyde reactant having the formula:

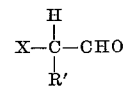

wherein R' is hydrogen, lower alkyl ($C_1$—$C_4$), or halogen and X is halogen, in the presence of an acid catalyst.

The ethylene ketals of mercaptocyclohexanones, one of the reactants in preparing the compounds of this invention, are described in copending application Ser. No. 512,250, filed concurrently herewith and reference can be made thereto for methods by which they can be prepared. Non-limiting examples of this reactant are the ethylene ketals of 3-mercaptocyclohexanone; of 3-mercapto-4-methylcyclohexanone; of 3-mercapto-4-ethyl-5-methylcyclohexanone; of 3-mercapto-5-octylcyclohexanone; of 3-mercapto-4,5,6-trimethylcyclohexanone; of 3-mercapto-4,5-diisopropylcyclohexanone; of 3-mercapto-5-hexenylcyclohexanone; of 3-mercapto-5,6-di-t-butyl-cyclohexanone, of 3-mercapto-4,5-divinylcyclohexanone, and of 3-mercapto-6-propenylcyclohexanone.

Typical, non-limiting examples of the haloaldehyde reactant are chloroacetaldehyde; 2,2-dichloroacetaldehyde; 2 - bromopropionaldehyde; 2,2 - diiodoacetaldehyde; 2-chlorobutyraldehyde; 2 - bromovaleraldehyde; and 2-chlorocaproaldehyde.

The reaction involved in the process of preparing the compounds of this invention can be carried out at atmospheric pressures at temperatures of between about 70° C. and about 100° C. In preferred practice, however, the reaction proceeds readily at the lower temperatures of this range, e.g., between about 70° C. and about 90° C.

The catalyst for this reaction is an organic acid, such as p-toluenesulfonic acid, or a mineral acid. Hydrochloric acid is a preferred mineral acid catalyst, but other mineral acids, such as phosphoric and sulfuric acids, can be used as well as common acidic clays, sulfonated resins, etc.

As water is evolved during the reaction, an inert solvent such as benzene, toluene, or xylene is used to remove the water by azeotropic distillation. The amount of solvent used will generally be between about 2 volumes and about 10 volumes per volume of starting material. Other aromatic, acyclic, and alicyclic hydrocarbons can be employed, but one should be chosen that will form an azeotrope with water at the temperatures set forth hereinbefore.

Non-limiting examples of the compounds of this invention are ethylene ketals of 3-(2-chlorovinylmercapto) cyclohexanone; of 3-(2,2-dichlorovinylmercapto)cyclohexanone; of 3-(2-bromopropenylmercapto)-4-methylcyclohexanone; of 3-(2-chlorovinylmercapto)-4-ethyl-5-methylcyclohexanone; of 3-(2,2-diiodovinylmercapto)-5-octylcyclohexanone; of 3-(2,2-dichlorovinylmercapto)-4,5,6-trimethylcyclohexanone; of 3-(2-chlorovinylmercapto)-4,5-diisopropylcyclohexanone; of 3-(2-bromopentenylmercapto)cyclohexanone; of 3-(2-chlorobutenylmercapto) cyclohexanone; and of 3-(2-chlorohexenylmercapto)cyclohexanone; of 3-(2-chlorovinylmercapto)-5-hexenylcyclohexanone; of 3-(2,2-dichlorovinylmercapto)-5,6-di-t-butylcyclohexanone; of 3-(2-chlorovinylmercapto)-4,5-divinylcyclohexanone; and of 3-(2,2-dichlorovinylmercapto)-6-propenylcyclohexanone.

The compounds of this invention are converted into partly hydrogenated 4-oxobenzothiophenes in one step by a reaction involving ring closure and hydrolysis of the ethylene ketal to the ketone. This reaction is carried out in the presence of mineral acid catalysts, as aforedescribed, and in the presence of sufficient water to effect the hydrolysis reaction. A suitable hydrocarbon solvent, such as xylene, should be used so that at reflux the temperature will be about 90–100° C. The conversion can be carried out at lower temperatures, but longer reaction times will be required.

The amount of halogen in the vinylmercapto substituent group is determinative of the degree of saturation of the final 4-oxobenzothiophene product. If a monohalo derivative (e.g., from choroacetaldehyde) is used, the 2, 4, 5, 6, 7, 7a-hexahydro derivative is obtained. When a dihalo derivative (e.g., from 2,2-dichloacetaldehyde is used, the 4,5,6,7,-tetrahydro derivative is produced.

The following examples demonstrate the process of this invention. It must be strictly understood, however, that this invention is not to be limited to the specific reactants and conditions employed, or to the operations and manipulations involved. Other reactions and conditions can be used, as is described hereinbefore.

Example 1

One gram of the ethylene ketal of 3-mercaptocyclohexanone was dissolved in 40 ml. benzene and 0.5 g. anhydrous chloroacetaldehyde was added. A few crystals of p-toluenesulfonic acid were added. Then, the reaction mixture was heated to distill off benzene (about 30 ml.), until it came over water-free. Make-up benzene was added to the reactor as the distillation proceeded. By vapor phase chromatography, the reaction product was identified as the ethylene ketal of 3-(2-chlorovinylmercapto)cyclohexanone.

Example 2

Benzene was evaporated from the solution of 3-(2-chlorovinylmercapto)cyclohexanone from Example 1, and 30 ml. xylene and 7 ml. of 10% aqueous hydrochloric acid solution were added. After refluxing the reaction mixture for one hour, 40% conversion was noted by vapor phase chromatography. Five drops of concentrated HCl were added and reflux continued for another hour. At this time there was 90% conversion to 4-oxo-2,4,5,6,7,7a-hexahydrobenzothiophene, as determined by vapor phase chromatography by comparison with an authentic sample from another source.

Example 3

In a manner similar to that described in Example 1, except that the aldehyde reactant is 2,2-dichloroacetaldehyde, there is obtained the ethylene ketal of 3-(2,2-dichlorovinylmercapto)cyclohenanone.

Example 4

Using the procedure of Example 2, the 3-(2,2-dichlorovinylmercapto)cyclohexanone of Example 3 is converted to 4-oxo-4,5,6,7-tetrahydrobenzothiophene, which is identified by comparison with an authentic sample from another source.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A cyclohexanone compound having the formula:

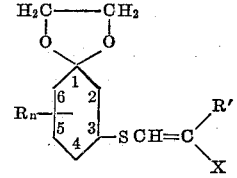

wherein R is selected from the group consisting of alkyl ($C_1$–$C_8$) and alkenyl ($C_2$–$C_8$), $n$ is 0 to 3, R' is selected from the group consisting of hydrogen, lower alkyl ($C_1$–$C_4$), and halogen and X is halogen.

2. The compound defined in claim 1, wherein $n$ is 0, R' is hydrogen and X is chlorine.

3. The compound defined in claim 1, wherein $n$ is 0 and R' and X are chlorine.

References Cited

UNITED STATES PATENTS 3,118,002   1/1964   Benzing _____ 260—609

NICHOLAS S. RIZZO, *Primary Examiner.*

UNITED STATES PATENT OFFICE
CERTIFICATE OF CORRECTION

Patent No. 3,399,216                                            August 27, 1968

Harold M. Foster et al.

It is certified that error appears in the above identified patent and that said Letters Patent are hereby corrected as shown below:

Column 2, line 24, "512,250" should read -- 515,250 --.

Signed and sealed this 24th day of February 1970.

(SEAL)
Attest:

Edward M. Fletcher, Jr.                          WILLIAM E. SCHUYLER, JR.
Attesting Officer                                         Commissioner of Patents